US008878374B2

(12) United States Patent
Turner et al.

(10) Patent No.: US 8,878,374 B2
(45) Date of Patent: Nov. 4, 2014

(54) BRUSHLESS ALTERNATOR FOR HELICOPTER TRANSMISSION INSTALL

(71) Applicant: Bell Helicopter Textron Inc., Fort Worth, TX (US)

(72) Inventors: Craig Turner, Lewisville, TX (US); Frank B. Stamps, Colleyville, TX (US); Maurice Griffin, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/766,204

(22) Filed: Feb. 13, 2013

(65) Prior Publication Data

US 2014/0225377 A1    Aug. 14, 2014

(51) Int. Cl.
*B64C 11/44* (2006.01)
*H02K 7/18* (2006.01)

(52) U.S. Cl.
CPC .................... *H02K 7/1861* (2013.01)
USPC ........................................... 290/1 R

(58) Field of Classification Search
CPC ........................................... B46C 11/44
See application file for complete search history.

(56) References Cited

U.S. PATENT DOCUMENTS

| 2,488,392 | A | * | 11/1949 | Forsyth | 416/146 R |
| 2,718,157 | A | * | 9/1955 | Schaub | 477/37 |
| 3,007,066 | A | * | 10/1961 | Ponsy | 310/96 |
| 3,243,621 | A | * | 3/1966 | Wesolowski | 310/168 |
| 4,243,358 | A | * | 1/1981 | Carlock et al. | 416/114 |
| 4,476,395 | A | * | 10/1984 | Cronin | 290/6 |
| 4,556,366 | A | * | 12/1985 | Sargisson et al. | 416/155 |
| 2013/0228654 | A1 | * | 9/2013 | Aubert et al. | 244/134 D |

FOREIGN PATENT DOCUMENTS

GB    263988 A  *  1/1927
RU    2211348 C1  *  8/2003

* cited by examiner

*Primary Examiner* — Joseph Waks
(74) *Attorney, Agent, or Firm* — James E. Walton; Richard G. Eldredge

(57) ABSTRACT

A system and method to converting mechanical rotational energy of an aircraft input shaft of a transmission to electrical energy. The system includes an alternator having an inductor carried by the aircraft transmission and a magnet carried by the aircraft input shaft. The input shaft rotates the magnet in relation to the inductor, which in turn converts the mechanical rotational energy to electrical energy.

19 Claims, 4 Drawing Sheets

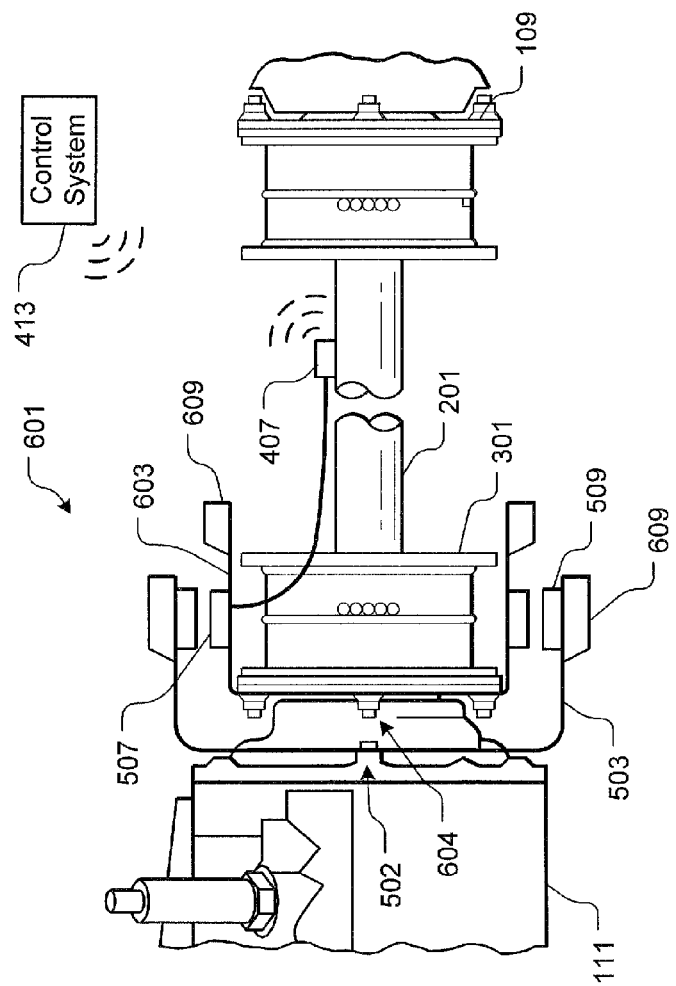
FIG. 6
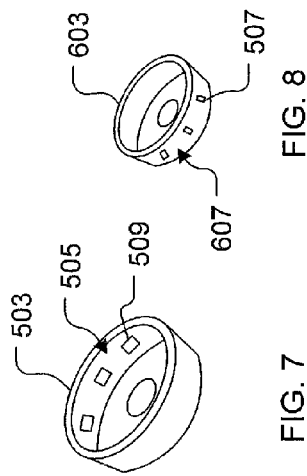
FIG. 7
FIG. 8

BRUSHLESS ALTERNATOR FOR HELICOPTER TRANSMISSION INSTALL

BACKGROUND

1. Field of the Invention

The present application relates generally to alternators, and more specifically, to aircraft transmission alternators.

2. Description of Related Art

Alternators are well known for converting mechanical energy to electrical energy that in turn powers one or more electrical subsystems. Conventional aircraft alternators are adapted to utilize a transmission accessory drive pad and driver shaft (see FIG. 2).

Common problems associated with conventional aircraft alternators include added weight due to, for example, shafts, gears, accessory pads, and the like operably associated with driving the alternator. These required devices result in efficiency losses, added manufacturing and maintenance costs, and an increase in engine power consumption.

Although significant developments in the field of aircraft alternators have been made, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6 is a side view of an alternative embodiment of the alternator of FIG. 5; and FIGS. 7 and 8 are perspective views of the housings of FIG. 6.

Figure 1:
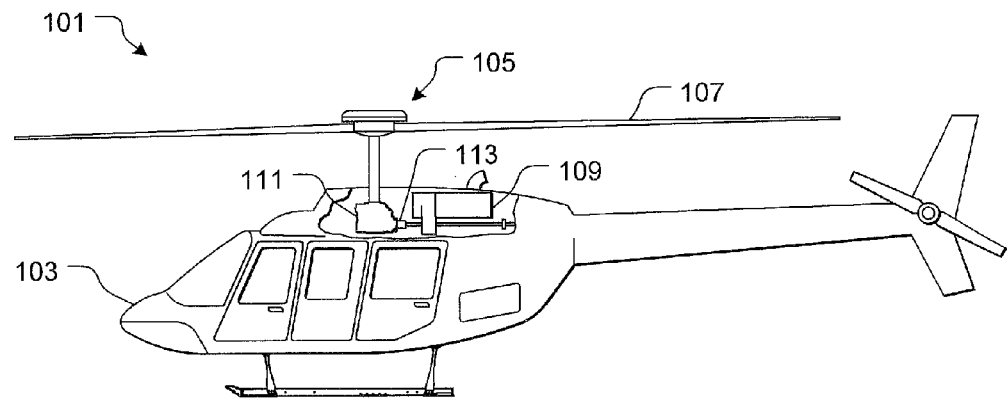
FIG. 1 is a side view of an aircraft according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcome the above-listed problems commonly associated with conventional aircraft alternators. Specifically, the alternator is operably associated with the transmission input drive shaft, which selective placement eliminates the need for a designated accessory drive pad associated with transmission in addition to eliminating the extra hardware required to operate the drive pad, for example, gears, shafts, and the like disposed within the transmission. The system and method of the present application greatly reduces costs associated with maintenance and manufacturing, and reduces the overall weight of the aircraft, which in turn increases lifting capacity and lowers power consumption. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight. An engine 109 rotatably couples to a transmission 111, which in turn drives rotor system 105.

One unique feature believed characteristic of the present application is utilizing the input shaft of the transmission to convert mechanical energy to electrical energy via an alternator system 113. The system utilizes the rotational energy of the input shaft to create electrical energy for powering one or more electrical subsystems. Alternator system 113 overcomes the foregoing problems commonly associated with conventional aircraft alternator system, as is further discussed below and shown in the accompany drawings.

Figure 2:
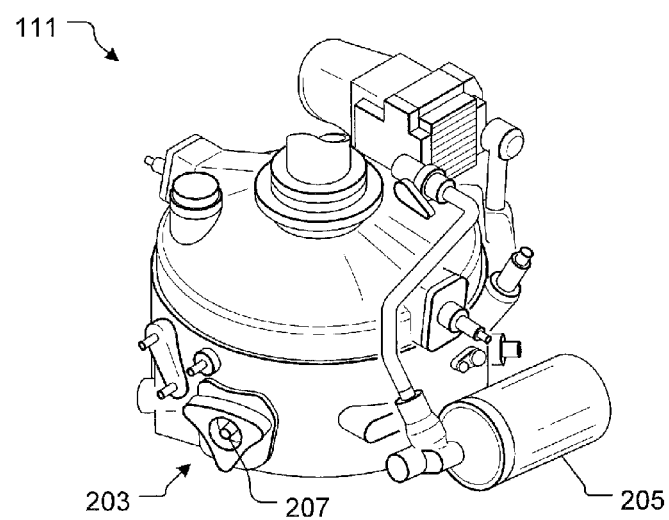
FIG. 2 is a perspective view of the transmission of FIG. 1.
Figure 3:
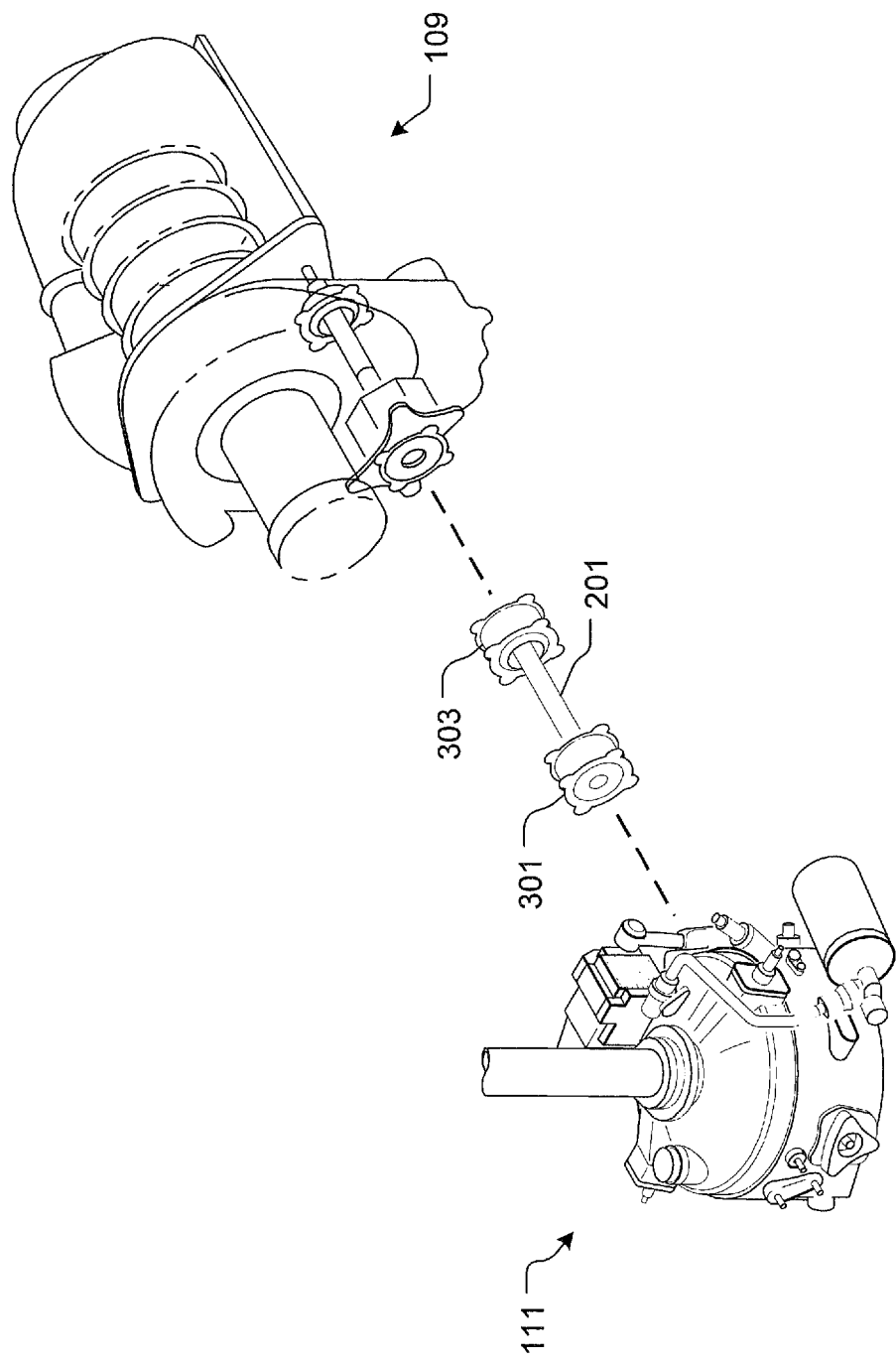
FIG. 3 is a perspective view of the transmission, drive shaft, and engine of FIG. 1.

FIGS. 2 and 3 illustrate perspective views of engine 109 and transmission 111 coupled together via an input drive shaft 201. System 113 utilizes the high input RPM of the input shaft to create a greater electrical energy output than conventional alternators. The selective positioning of the alternator system allows for larger sized alternators, resulting in an increased electrical output. Also, another advantage includes protecting the alternator against the elements by utilizing the engine fuselage panels.

As depicted, transmission 111 includes a plurality of accessory drive pads 203 adapted to couple with, for example, an oil filter 205, alternator, and other devices operably associated the aircraft. Drive pad 203 provides coupling means for attaching these devices directly to transmission 111. The drive pads also provide access to a shaft 207 rotatably coupled to one or more gears, drive shafts, and other components housed within transmission 111 and operably associated with input shaft 201.

It should also be understood that conventional transmissions typically have a designated drive pad and shaft for an alternator; however, in the exemplary embodiment, drive pad 203 is designated for a device other than an alternator, unless a secondary backup alternator is desired. Thus, in accordance with the features of the present application, transmissions can be designed more efficiently without the necessary hardware for powering an alternator via a drive pad 203 and shaft 207.

It will be appreciate that eliminating the number of required drive pads 201 and devices associated therewith reduces maintenance and manufacturing costs in addition to reducing the overall aircraft weight and power consumption required for flight, resulting in added savings.

In FIG. 3, two input shaft couplings 301 and 303 are utilized to rotatably couple input drive shaft 201 to both engine 109 and transmission 111. In the contemplated embodiment, alternator system 113 utilizes coupling 301 as means for placement. Further detailed discussion of these features is provided below.

Figure 4:
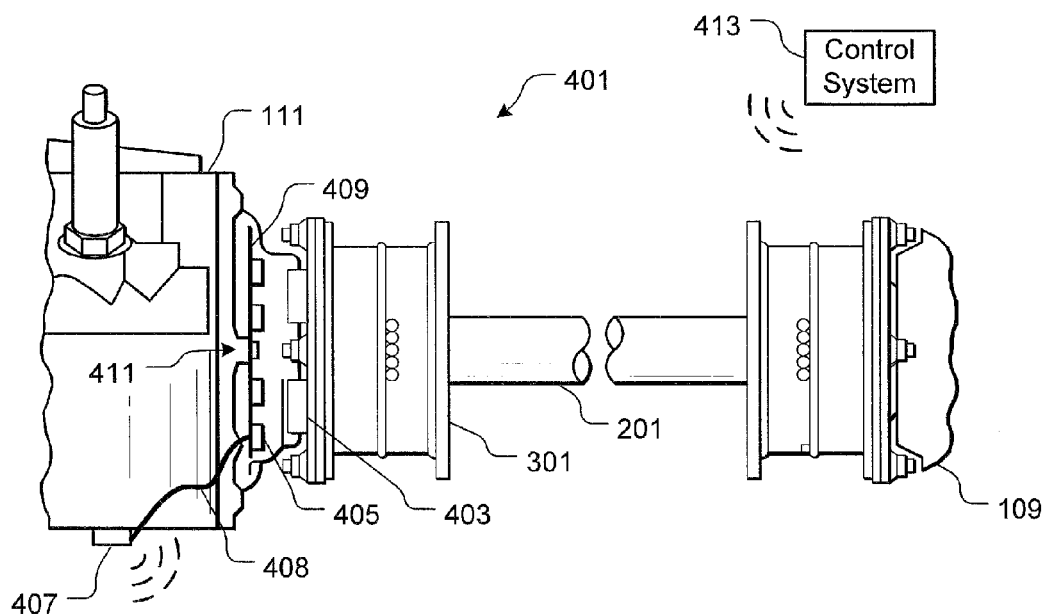
FIG. 4 is a side view of an alternator according to a preferred embodiment of the present application.
Figure 5:
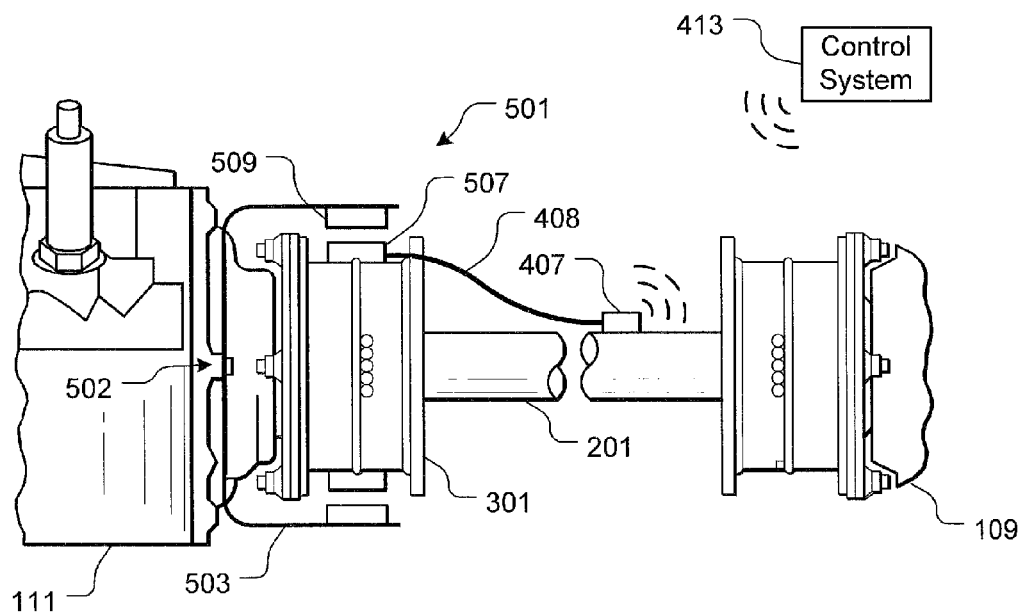
FIG. 5 is a side view of an alternative embodiment of the alternator of FIG. 4.

The following FIGS. 4-6 provide side views of different alternator embodiments of alternator system 113. It will be appreciated that the different embodiments are substantially similar in form and function, and it is contemplated sharing one or more of the same features.

FIG. 4 shows a side view of alternator 401 having a plurality of magnets 403 operably associated with a plurality of inductors 405. During operation, magnets 403 rotate relative to inductors 405 for converting mechanical rotational energy of the input shaft 201 to electrical energy, which in turn powers one or more electrical subsystems, for example, electrical subsystem 407, which in this embodiment is attached to the non-rotating structure. It should be appreciated that either inductor 405 or magnet 403 can rotated relative to each other in the contemplated embodiment, thus, allowing attachment of either device to either the rotating structure, i.e., the shaft, or the stationary structure, i.e., the transmission. It is also contemplated attaching the electrical subsystem 407 directly to the inductors via a wire 408.

It should be noted that the inductor is any device operably associated with a magnet to create electrical energy, and in the preferred embodiment inductor 405 is a coil of wire. However, it is also contemplated utilizing different types of inductors in lieu of the preferred embodiment. It should also be noted that magnet 403 could be any device that emits a magnetic field.

In the exemplary embodiment, inductor 405 attaches to the stationary section of transmission 111, preferably via a removably attachable flange 409, while the magnets 403 are mounted to the rotating input shaft, preferably via the coupling 301.

It will be appreciated that alternator 401 is configured to be removably attached to the transmission and input drive shaft for ease of repair and for retrofitting existing aircraft. In the contemplated embodiment, flange 409 securely receives one or more fasteners 411, preferably a bolt, associated with transmission 111, while the magnets are configured to preferably attach directly to coupling 301.

FIG. 5 depicts a side view of an alternator 501 having a housing 503 configured to peripherally extend at least partially around coupling 301. It should be noted that FIG. 5 illustrates a cross-sectional view of housing 503, while FIG. 7 illustrates the perspective view of housing 503. It is also contemplated utilizing a flange that does not extend the entire length of coupling 301 in alternative embodiments. In the contemplated embodiment, housing 503 removably attaches to transmission 111 via a fastener 502, preferably an existing bolt of transmission 111.

Carried within and attached to an inner surface 505 of housing 503 is a plurality of magnets 509 operably associated with a plurality of inductors 507 carried on coupling 301. In the exemplary embodiment, inductors 507 rotate within housing 503, which in turn creates electrical energy for powering one or more electrical subsystems, for example, electrical subsystem 407, which in this embodiment is carried on shaft 201.

FIG. 6 shows a side view of alternator 601 having housing 503, referred to as an outer housing, and an inner housing 603 at least partially disposed within outer housing 503. It should be noted that FIG. 6 illustrates a cross-sectional view of housing 603, while FIG. 8 illustrates the perspective view of housing 603. In the contemplated embodiment, housing 603 removably attaches to coupling 301 via a fastener 604, preferably an existing bolt of the coupling.

In the exemplary embodiment, a plurality of magnets 509 is attached to the inner surface of inner housing 503. During operation, inner housing 603 and inductors 507 rotate within outer housing 503, which in turn creates electrical energy for powering one or more electrical subsystem, for example, subsystem 407.

An optional plurality of fins 609 are shown associated with housings 503 and 603 for manipulating airflow to cool either transmission 111, engine 109, and/or alternator 601. During operation, the array of fins directs the air as input shaft 201 rotates housing 603.

In FIGS. 4-6, electrical subsystem 407 is shown conductively coupled to the different alternator embodiments. In the contemplated embodiment, subsystem 407 is a torque meter that transmits wirelessly data to a control system 413, which in turn monitors the input shaft, engine, and/or transmission performance.

One unique feature believed characteristic of the present application is the capability to power one or more electrical subsystems coupled directly to the input drive shaft via the alternator, thereby eliminating the need for a slip-ring and/or other devices required to power such devices in conventional aircraft embodiments.

Although particular step sequences of a method to convert mechanical to electrical energy via an alternator are shown described and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An alternator for an aircraft transmission, the alternator comprising:
   an inductor carried by the aircraft transmission;
   a magnet carried by an input shaft operably associated with driving the aircraft transmission; and
   a flange removably attached to the aircraft transmission and configured to carry the inductor;
   wherein the input shaft rotates the magnet in relation to the inductor; and
   wherein the magnet and the inductor convert the mechanical rotational energy of the input shaft to electrical energy for powering an electrical subsystem.

2. The alternator of claim 1, wherein:
   the electrical subsystem is carried by the input shaft; and
   the alternator is conductively couple to the electrical subsystem.

3. The alternator of claim 2, wherein the electrical subsystem wirelessly communicates data to a control system.

4. The alternator of claim 1, further comprising:
   a coupling attached to input shaft;
   wherein the coupling is configured to rotate and to couple the input shaft to the transmission; and
   wherein the coupling carries the magnet.

5. The alternator of claim 4, wherein:
   the electrical subsystem is carried by the input shaft; and
   the alternator is conductively couple to the electrical subsystem.

6. The alternator of claim 5, wherein the electrical subsystem wireless communicates data to a control system.

7. The alternator of claim 1, further comprising:
   a housing attached to the aircraft transmission, the housing being configured to peripherally extend around a circumference of the input shaft;
   wherein the inductor is carried on an inner surface of the housing.

8. The alternator of claim 7, wherein the housing removably attaches to the aircraft transmission.

9. The alternator of claim 7, further comprising:
   a coupling attached to the input shaft;
   wherein the housing receives at least a portion of the coupling; and
   wherein the coupling carries the magnet.

10. The alternator of claim 1, further comprising:
    an inner housing attached to the input shaft and configured to carry the magnet on an outer surface.

11. The alternator of claim 10, further comprising:
    a coupling attached to input shaft;
    wherein the inner housing removably attaches to the coupling.

12. The alternator of claim 10, further comprising:
    a fin attached to an outside surface of the inner housing, the fin being configured to direct air.

13. The alternator of claim 10, wherein:
    the electrical subsystem is carried by the input shaft; and
    the alternator is conductively couple to the electrical subsystem.

14. The alternator of claim 13, wherein the electrical subsystem wireless communicates data to a control system.

15. The alternator of claim 10, further comprising:
    an outer housing attached to the aircraft transmission, the outer housing being configured to peripherally extend around the inner housing;
    wherein the inductor is carried on an inner surface of the outer housing.

16. An aircraft, comprising:
    an engine;
    a transmission;
    an input shaft rotatably coupled to both the engine and the transmission;
    an alternator attached to the transmission and the input shaft;
    an inductor carried by the aircraft transmission; and
    a flange removably attached to the aircraft transmission and configured to carry the inductor;
    wherein the input shaft is configured to provide mechanical energy to the alternator that is converted to electrical energy.

17. The aircraft of claim 16, further comprising:
    an electrical subsystem carried on the input shaft;
    wherein the electrical subsystem is conductively coupled to the alternator.

18. A method, comprising:
    securing an inductor to an aircraft transmission via a removable flange;
    securing a magnet to an input driver shaft associated with the aircraft transmission;
    converting mechanical rotational energy from the input shaft to electrical energy via the alternator as the input shaft drives the transmission.

19. The method of claim 18, further comprising:
    securing an electrical subsystem to the input shaft;
    powering the electrical subsystem with the alternator; and
    wirelessly transmitting data from the electrical subsystem to a control system.

* * * * *